June 3, 1930.  A. HEBNER  1,761,916
TIRE CARRIER
Filed Sept. 15, 1928
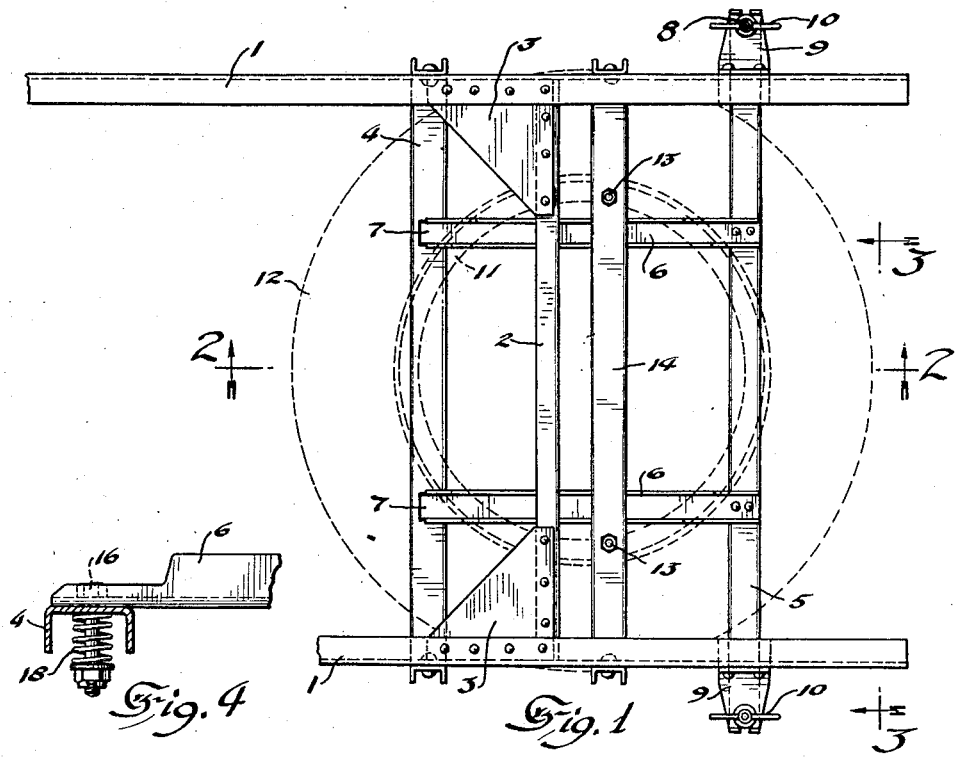
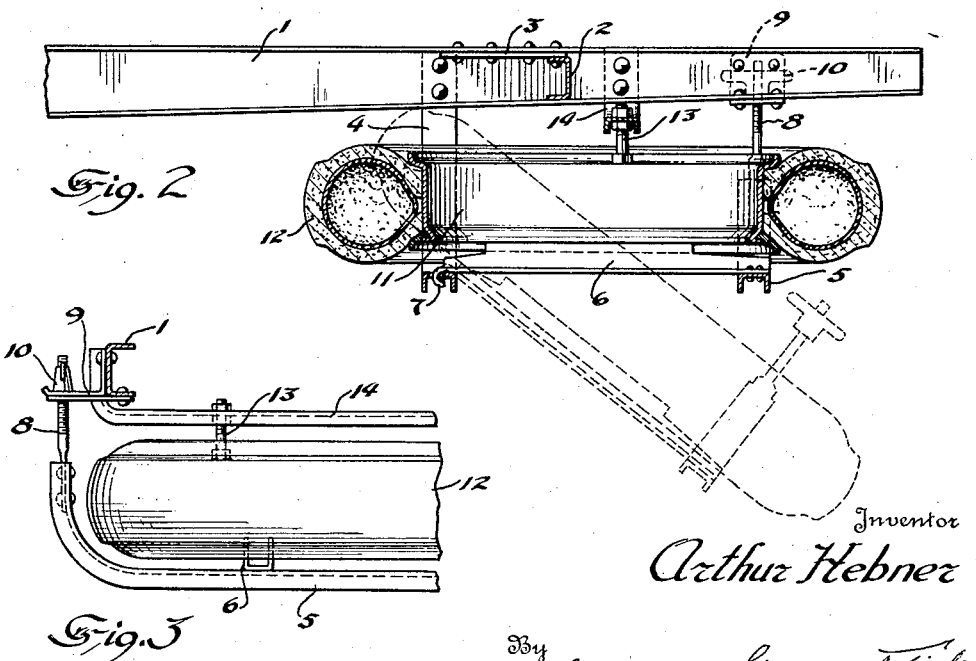
Inventor
Arthur Hebner Patented June 3, 1930

1,761,916

UNITED STATES PATENT OFFICE

ARTHUR HEBNER, OF PONTIAC, MICHIGAN, ASSIGNOR TO GENERAL MOTORS CORPORATION, OF DETROIT, MICHIGAN, A CORPORATION OF DELAWARE

TIRE CARRIER

Application filed September 15, 1928. Serial No. 306,118.

This invention relates to motor vehicles and more particularly to spare tire carriers. It is especially adapted for use on commercial automobiles and trucks and contemplates the mounting of a spare tire beneath the vehicle frame, and preferably at the rear thereof, where the tire will be out of the way and yet readily accessible.

It is one of the objects of the invention to provide a spare tire carrier that will be simple and, at the same time, sturdy in construction, comprising but a few parts of low cost.

A further object of the invention is to provide a carrier that will be easy to manipulate so as to facilitate the convenient and ready removal or replacement of the extra tire.

Another object of the invention is to provide a carrier for securely holding the extra tire against displacement thereon or loss therefrom, and which also supports the tire casing out of contact with adjacent parts so as to preclude chafing thereof.

Other objects and advantages will be apparent from the following specification when taken in connection with the accompanying drawing, in which Fig. 1 is a top plan view, showing a preferred but not necessarily the only embodiment of the invention applied to the vehicle chassis. Fig. 2 is a sectional view taken on line 2—2 of Fig. 1. Fig. 3 is a fragmentary rear elevation looking in the direction of the arrows on line 3—3 of Fig. 1. Fig. 4 is a detail view showing a modification.

Referring to the drawing, the numerals 1—1 mark a pair of longitudinally extending channel shaped members of the chassis frame, and 2 indicates a transversely extending channeled frame member connected with the side bars 1—1 by gusset plates 3. Rigidly secured, as by rivets or bolts, to the vertical web of the frame members 1—1 and depending there-beneath is a U-shaped bar 4, preferably of channeled section, on which is hinged the tire supporting platform. The tire supporting platform includes a transverse U-shaped bar 4 to which is rigidly secured, as by rivets, a pair of spaced tie bars 6, the front ends of which are provided with hooks 7 extending through openings or slots in the bar 4, thereby constituting a hinged connection. To each upturned end of the bar 5 is secured a screw threaded stud or bolt 8, that extends through an opening or slot in the bifurcated bracket 9 carried by the frame members 1—1, and has a wing nut 10 threaded thereon to hang the rear end of the swinging platform from the frame. The bars 6 are of channel shape with the channel opening upwardly and the vertical webs thereof are cut away at each end, so that the rim 11 carrying the pneumatic tire 12, rests upon the top of the sides and is centered thereby, the tire casing being held spaced or out of contact with the adjacent portions of the platform. A pair of bolts 13 carried by a transverse bar 14, provide stops against which the upper side of the tire rim abuts when the wing nuts 10 are drawn up, serving to positively hold the tire on the platform. The rim in effect is held clamped between the rim engaging studs 13 and the tie bars 6.

When it is desired to remove the tire the wing nuts 10 are threaded back to permit the studs 8 to be bent out beyond the ends of the supporting brackets 9, after which the platform may be allowed to swing toward the ground about its pivotal connection with the bar 4 to the position shown in dotted lines in Fig. 2. In this position the tire may be readily removed from the carrier or a different tire substituted. Upon lifting the rear end of the platform and drawing up the wing nuts, the tire will again be securely held in position.

In lieu of forming the hooks 7 on the extremities of the tie bars 6, the modified arrangement shown in Fig. 4 may be employed. In this case, the tie bars are connected to the supporting member 4 by a stud 16 which carries a coil spring 18. The tension of the spring prevents any possibility of rattle, particularly when there is no tire being carried on the support, and the flexibility of the spring 18 will permit the platform to swing downwardly when it is desired to remove or replace the spare tire.

I claim:

1. An underslung tire carrier, including in combination with a chassis frame, of a pair of U-shaped bars extending transversely across and beneath the frame in longitudinally spaced relation, one of the bars having its opposite legs rigidly fastened to the side members of the frame, and the other bar having its opposite legs adjustably secured to the side frame members, and tire engaging means extending across the space between the bars and rigidly connected at one end to said adjustable bar and loosely connected at the opposite end to the rigid bar.

2. An underslung tire carrier, including in combination with a chassis frame, of a pair of U-shaped bars extending transversely across and beneath the frame in longitudinally spaced relation, one of the bars having its opposite legs rigidly fastened to the side members of the frame, and the other bar having its opposite legs adjustably secured to the side frame members, means for engagement with the underside of the tire, extending across the space between the bars and rigidly connected with the adjustable bar and connected with the rigid bar for pivotal movement and a rigid abutment for the upper side of the tire into and out of engagement with which the tire is moved upon the swinging of said means about its pivotal connection with the fixed bar when the adjustable bar is moved relative to the frame.

3. The structure of claim 2, wherein the rigid abutment for the upper side of the tire is adjustable to different positions to co-operate with the adjustable connections of the adjustable bar in accommodating tires of various sizes.

4. An underslung tire carrier, including in combination with a chassis frame, of a pair of U-shaped bars extending transversely across and beneath the frame in longitudinally spaced relation, one of the bars having its opposite legs rigidly fastened to the side members of the frame, and the other bar having its opposite legs adjustably secured to the side frame members, a pair of transversely spaced tie bars of angular cross section, extending between and rigidly connected with the adjustable bar and pivotally connected with the fixed bar, to constitute a platform swingable about the fixed bar upon adjustment of the other bar, one of the angular portions of each tie bar being formed with shoulders at opposite ends for engagement below and inside the tire to support and center the same on the platform, and a rigid abutment fixed with the frame for engagement with the upper side of the tire.

In testimony whereof I affix my signature.

ARTHUR HEBNER.